United States Patent [19]

Kusunoki et al.

[11] Patent Number: 4,769,724
[45] Date of Patent: Sep. 6, 1988

[54] MAGNETIC HEAD DRIVE APPARATUS WHICH USES A COMMON CURRENT SOURCE FOR THE READ/WRITE HEAD AND THE ERASING HEAD

[75] Inventors: Masahiro Kusunoki; Hiroshi Ohashi, both of Tokyo, Japan

[73] Assignee: Kabushiki Kaisha Toshiba, Kawasaki, Japan

[21] Appl. No.: 926,527

[22] Filed: Nov. 4, 1986

[30] Foreign Application Priority Data

Nov. 30, 1985 [JP] Japan .................................. 60-269679

[51] Int. Cl.[4] ...................... G11B 15/12; G11B 5/024; G11B 5/265
[52] U.S. Cl. ........................................ 360/61; 360/63; 360/66; 360/46; 360/68
[58] Field of Search ...................... 360/46, 61, 63, 66, 360/68, 118, 123

[56] References Cited

U.S. PATENT DOCUMENTS 4,553,179 11/1985 Inami et al. ............................. 360/66
4,611,253 9/1986 Kamei et al. ........................... 360/66
4,651,235 3/1987 Morita et al. .......................... 360/46

FOREIGN PATENT DOCUMENTS 3514065 4/1984 Netherlands ............................ 360/66

Primary Examiner—Raymond F. Cardillo
Assistant Examiner—Kevin Fournier
Attorney, Agent, or Firm—Finnegan, Henderson, Farabow, Garrett and Dunner

[57] ABSTRACT

In a magnetic head drive apparatus of this invention, a coil of an erasing head is connected to a center point of the coils of a read/write head, and a drive current from a constant-current source is alternately supplied to both terminals of the coil of the read/write head, according to the polarity of the write data. When the read/write head is driven to write data in a magnetic recording medium, the erasing head and the read/write head are driven at an identical timing. In this case, the drive currents for the read/write head and the erasing head are supplied from a single-current source. For this reason, separate constant-current sources are not necessary for the read/write head and the erasing head.

7 Claims, 2 Drawing Sheets

MAGNETIC HEAD DRIVE APPARATUS WHICH USES A COMMON CURRENT SOURCE FOR THE READ/WRITE HEAD AND THE ERASING HEAD

BACKGROUND OF THE INVENTION

The present invention relates to a magnetic head drive apparatus in a floppy disk system for driving the read/write head and the erasing head at a substantially identical timing.

A conventional floppy disk system uses a magnetic head assembly consisting of a read/write head and an erasing head. Data can be reliably written in a magnetic recording medium, since the erasing head guarantees proper overwrite/erase, covering a gap between data tracks, even if off-tracking occurs.

In a conventional floppy disk apparatus, an erasing head is normally of a tunnel erase type. Since the erasing head is located behind the read/write head, the off-tracking margin is wide. However, with this type of erasing head, its operating timing is different from that of the read/write head. For this reason, in addition to requiring a device for controlling the operation timing of the read/write head, a control device is also requiring for independently controlling the ON/OFF timing of the erasing head, and this increases the total cost of the system.

Recently, in floppy disk drives a magnetic head of a preerase type has been developed, in which the erasing head is located immediately before the read/write head and is operated substantially at the same timing as that of the read/write head. In a straddle-type erasing head, the operation timings of the erasing head and the read/write head are substantially identical. Unlike in the erasing head of the tunnel erase type, the erasing heads of the preerase and straddle erasing types do not require the circuit for independently controlling the ON/OFF timings of the erasing head.

In a conventional magnetic head drive apparatus using an erasing head of the "erase-before-write" or straddle erase type, constant-current circuits, for supplying drive currents to the read/write head and the erasing head, are necessary. For this reason, demand for simplification of the circuit arrangement, with the resulting decrease in power consumption, has not yet been sufficiently satisfied.

SUMMARY OF THE INVENTION

The present invention has been made in consideration of the above situation, and has as its object to provide a magnetic head drive apparatus for a floppy disk system, wherein a common constant-current circuit can be used to drive both the read/write head and the erasing head, whereby the circuit arrangement can be simplified, and power consumption can be reduced. The magnetic head drive apparatus comprises: a read/write head having a first coil wound around a first core, the first coil being divided into two portions which have a center point therebetween; an erasing head having a second coil wound around a second core, the second coil being provided with one terminal connected to the center point of the first coil of the read/write head, said erasing head being adapted to receive, via the center point, a drive current supplied to one of both terminals of the first coil of the read/write head and being driven by the input drive current; constant-current source means for supplying the drive current to the read/write head and the erasing head, in response to a first control signal, the constant-current source means being provided with a low-level terminal connected to the other terminal of the erasing head; and current-supply means, connected to both terminals of the read/write head and to the high-level terminal of the constant-current source means, for alternately supplying the drive current from the constant-current source means to both terminals of the first coil of the read/write head, on the basis of write data.

According to the present invention as described above, a common constant-current circuit can be used to drive both the read/write head and the erasing head. As a result, the arrangement of the magnetic head drive circuit can be simplified, and power consumption can be reduced.

DETAILED DESCRIPTION OF THE PREFERRED EMBODIMENTS

Figure 1:
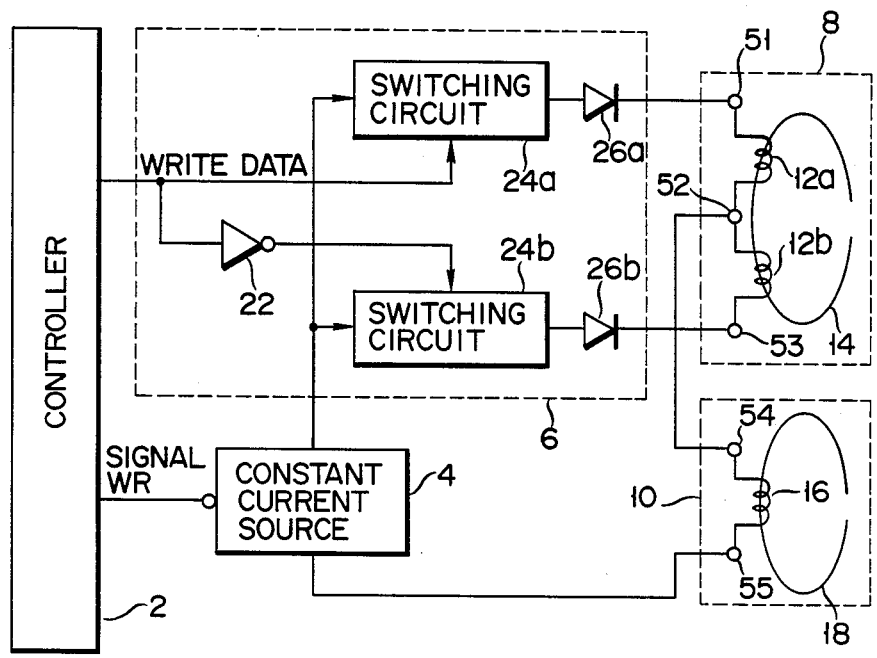
FIG. 1 is a block diagram of a magnetic head drive apparatus according to an embodiment of the present invention.

Magnetic head drive apparatuses according to preferred embodiments of the present invention will now be described with reference to the accompanying drawings.

An arrangement of a magnetic drive apparatus according to an embodiment of the present invention will be described with reference to FIG. 1. Read/write head 8 comprises core 14 and coils 12a and 12b magnetically coupled to core 14. Similarly, erasing head 10 comprises core 18 and coil 16 magnetically coupled to core 18. The apparatus comprises controller 2 for controlling the overall operation, read/write head 8 for writing write data in a magnetic recording medium, erasing head 10, one terminal 54 of coil 16 of which is connected to central point 52 of coils 12a and 12b of head 8, and the other terminal 55 of which is connected to the low-level terminal of source 4, constant-current source 4 for supplying a drive current to heads 8 and 10, and current-supply unit 6, connected to both terminals 51 and 53 of coils 12a and 12b of head 8 and to the high-level terminal of source 4, for alternately supplying the drive current to terminals 51 and 53.

Current-supply unit 6 comprises inverter 22 for receiving write data and for inverting the polarity of input write data, switching circuit 24a, responsive to write data, for supplying the drive current supplied from constant-current source 4 to terminal 51 of read/write head 8, when the write data is positive, switching circuit 24b, responsive to the write data inverted by inverter 22, for supplying the drive current supplied from source 4 to terminal 53 of head 8, when the inverted write data is positive, and diodes 26a and 26b, respectively connected between terminal 51 and circuit 24a and between terminal 53 and circuit 24b, for preventing the drive current from flowing to switching circuits 24a and 24b.

The operation of the magnetic head drive apparatus having the arrangement described above will be described hereinafter.

In a data-write mode, signal WR (write gate) is supplied from controller 2 to constant-current source 4. In this case, signal WR is active low and is triggered at the trailing edge thereof. Source 4 then starts supplying the current to current-supply unit 6.

At the same time, write data is supplied from controller 2 to current-supply unit 6. If the input write data is data shown in FIG. 2A, switching circuit 24a is turned on in response to data a, and the drive current is supplied to coil 12a via diode 26a and terminal 51. Thereafter, the drive current is supplied to coil 16 of erasing head 10, from terminal 54, via center point 52. The current then returns to constant-current source 4, from terminal 55.

Figure 2:
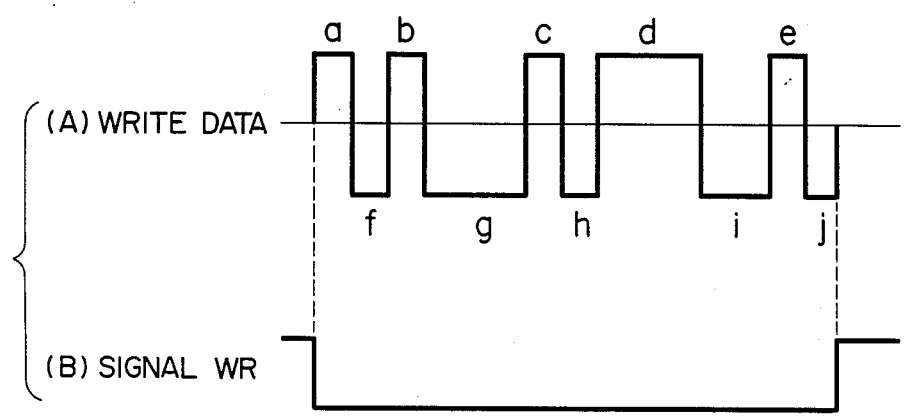
FIG. 2A is a timing chart of write data recorded is a magnetic recording medium.
FIG. 2B is a timing chart of signal WR for controlling a constant-current source.

If data has negative polarity, indicated by f in FIG. 2A, switching circuit 24b is used. More specifically, data is inverted by inverter 22 so that the resultant data f has positive polarity. Switching circuit 24b is turned on in response to this write data. As a result, the drive current is supplied to coil 12b via diode 26b and terminal 53. Thereafter, the drive current is supplied to coil 16 of erasing head 10, from terminal 54, via center point 52. The current flow then returns to constant-current source 4, from terminal 55.

At timings a, b, c, d, and e of data shown in FIG. 2A, switching circuit 24a is used. However, switching circuit 24b and inverter 22 are used at timings f, g, h, i, and j.

The number of rotations of coil 16 of erasing head 10 is determined, so that it generates an optimal magnetic field in response to the drive current from constant-current source 4. Therefore, reliable data-erasure can be performed.

As described above, erasing head 10 is driven by the current used for writing data. Therefore, constant-current source 4 can be commonly used by read/write and erasing heads 8 and 10, respectively.

Another embodiment of the present invention will now be described with reference to FIG. 3. The same reference numerals as in FIG. 1 denote the same parts in FIG. 3.

Figure 3:
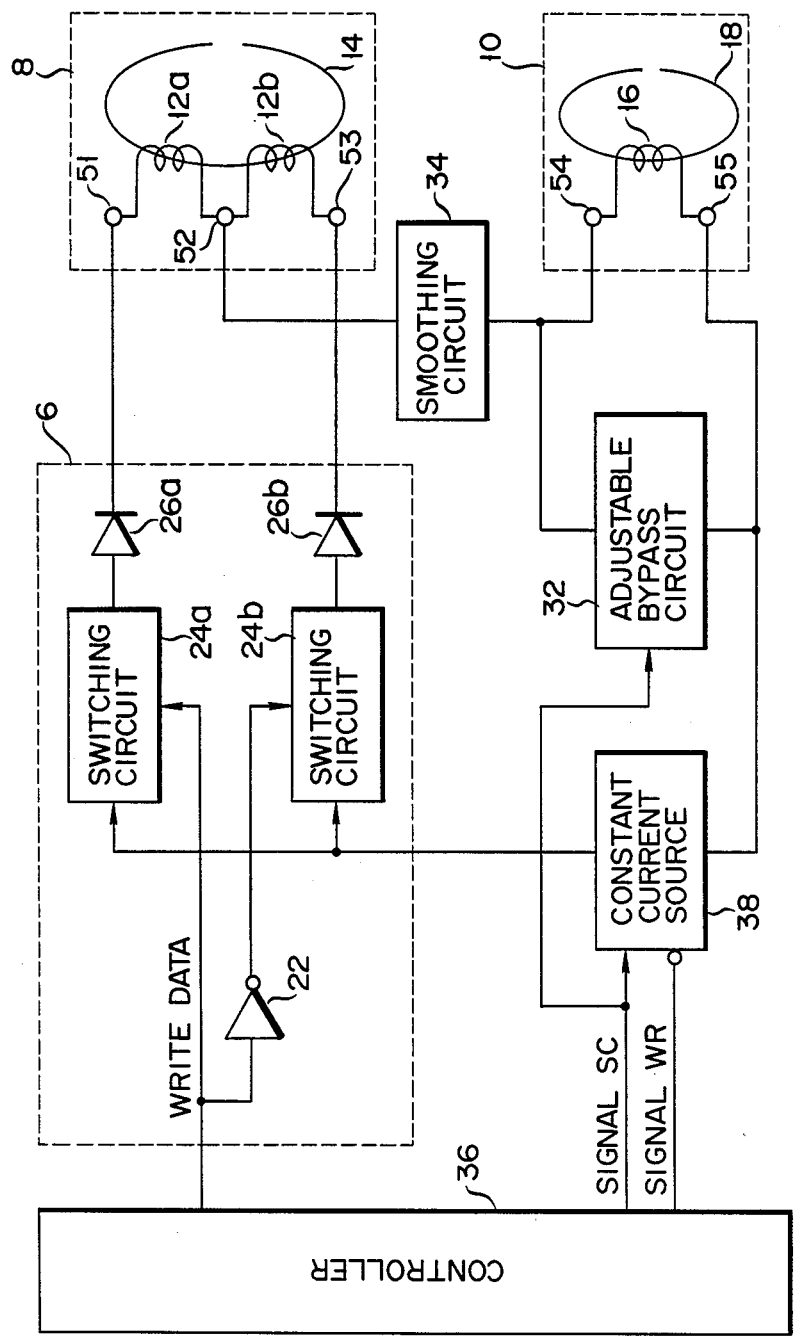
FIG. 3 is a block diagram of a magnetic head drive apparatus according to another embodiment of the present invention.

The arrangement in FIG. 3 includes smoothing circuit 34 arranged between center point 52 of read/write head 8 and terminal 54 of erasing head 10, to suppress a ripple component of the drive current flowing from head 8, and adjustable bypass circuit 32 provided in parallel with head 10, in addition to the arrangement in FIG. 1.

The basic operation of controller 36 is the same as that of controller 2 in FIG. 1. Controller 36 can also generate signal SC. Signal SC represents a mode for determining that write data is written in the inner or outer tracks of the magnetic recording medium.

Constant-current source 38 supplies a drive current in response to signal WR from controller 36. The magnitude of the drive current is changed in response to signal SC.

Adjustable bypass circuit 32 is used to bypass part of the drive current output from smoothing circuit 34. The magnitude of the magnetic field generated by erasing head 10 can be optimally controlled. Circuit 32 also changes the magnitude of the bypassed current, in response to signal SC.

The operation of the magnetic head drive apparatus of this embodiment will be described below. The drive current is supplied to read/write and erasing heads 8 and 10, respectively, in the same manner as in the embodiment of FIG. 1, and thus, a detailed description thereof will be omitted.

If data is written in the inner tracks of the magnetic recording medium, signal SC is not generated by controller 36. A drive current having a first predetermined value is output from constant-current source 38. The current from read/write head 8 is bypassed by a current having a value of the second predetermined value. Therefore, a current having a value of the difference between the first and third predetermined values is supplied across erasing head 10.

If data is written in the outer tracks of the magnetic recording medium, signal SC is output from controller 36. A drive current having a third predetermined value is generated by constant-current source 38. A current flowing through read/write head 8 is bypassed by a current having a fourth predetermined value. Therefore, a current having a value of the difference between the third and fourth predetermined values is supplied across erasing head 10.

In this manner, optimal recording and erasure are performed in the magnetic recording medium. In the above embodiment, the constant-current source and the bypass circuit are operated to discretely change the currents, by the predetermined values. However, these circuits may be designed to change the currents continuously, in accordance with signal SC.

As described above, if the read/write head is driven to write the write data in the magnetic recording medium, the read/write head and the erasing head are driven at an identical timing. In this case, the drive currents for the read/write head and the erasing head are supplied from the single constant-current source. For this reason, separate constant-current sources are not necessary for the read/write head and the erasing head. The arrangement of the constant-current source can thus be simplified, and power consumption can accordingly be reduced, as compared the conventional arrangement. In addition, the peripheral wiring arrangement of the read/write head and the erasing head can also be simplified. The magnetic forces of the read/write head and the erasing head can also be optimized.

What is claimed is:

1. A magnetic head drive apparatus comprising:
a read/write head having a first coil wound around a first core, said first coil being divided into two portions which have a center point therebetween;
an erasing head having a second coil wound around a second core, said second coil being provided with one terminal connected to said center point of said first coil of said read/write head, said erasing head being adapted to receive, through said center point, a drive current supplied to one or both terminals of said first coil of said read/write head and being driven by the input drive current;
constant-current source means for supplying the drive current to said read/write head and said erasing head, in response to a first control signal input thereto, said constant-current source means being provided with a low-level terminal connected to said other terminal of said erasing head; and
current-supply means, connected to said both terminals of said read/write head and a high-level terminal of said constant-current source means, for alternately supplying the drive current from said constant-current source means to said both terminals of said first coil of said read/write head, on the basis of write data.

2. An apparatus according to claim 1, wherein said current-supply means comprises:

first switching means for supplying the drive current from said constant-current source means to one terminal of said first coil of said read/write head, in response to the presence of write data, if the write data has one polarity, so as to write the write data;

inverting means for inverting the polarity of the write data; and second switching means for supplying the drive current from said constant-current source means to the other terminal of said first coil of said read/write head, in response to the presence of inverted write data, if the inverted write data has said one polarity, so as to write the inverted write data.

3. An apparatus according to claim 1, wherein said apparatus further comprises a smoothing circuit for smoothing the drive current supplied to said erasing head, said one terminal of said second coil of said erasing head being connected to said center point of said first coil of said read/write head, via said smoothing circuit.

4. An apparatus according to claim 1, wherein said second coil performs a predetermined number of rotations, so as to generate a magnetic field sufficient to erase data recorded on said magnetic recording medium.

5. An apparatus according to claim 1, further comprising bypass means for bypassing part of the drive current flowing out from said center point of said first coil, so as to adjust the drive current flowing through said erasing head.

6. An apparatus according to claim 5, wherein said constant-current source means further comprises means for changing the magnitude of the drive current in response to a second control signal input thereto; and said bypass means further comprises means for changing the magnitude of the bypass current in response to the second control signal input thereto.

7. An apparatus according to claim 1, wherein said constant-current source means further comprises means for changing the magnitude of the drive current in response to a second control signal input thereto.

* * * * *